UNITED STATES PATENT OFFICE.

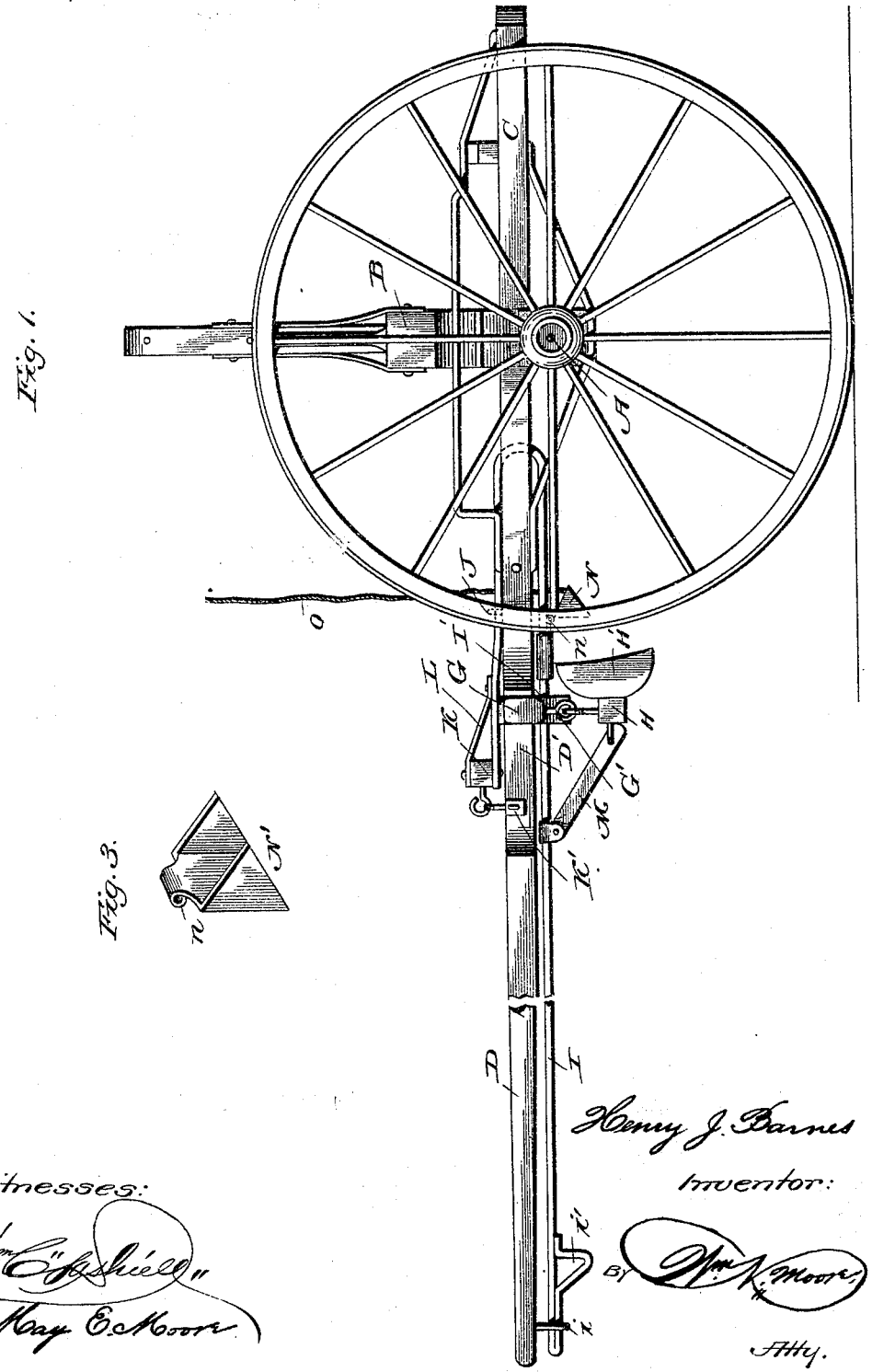

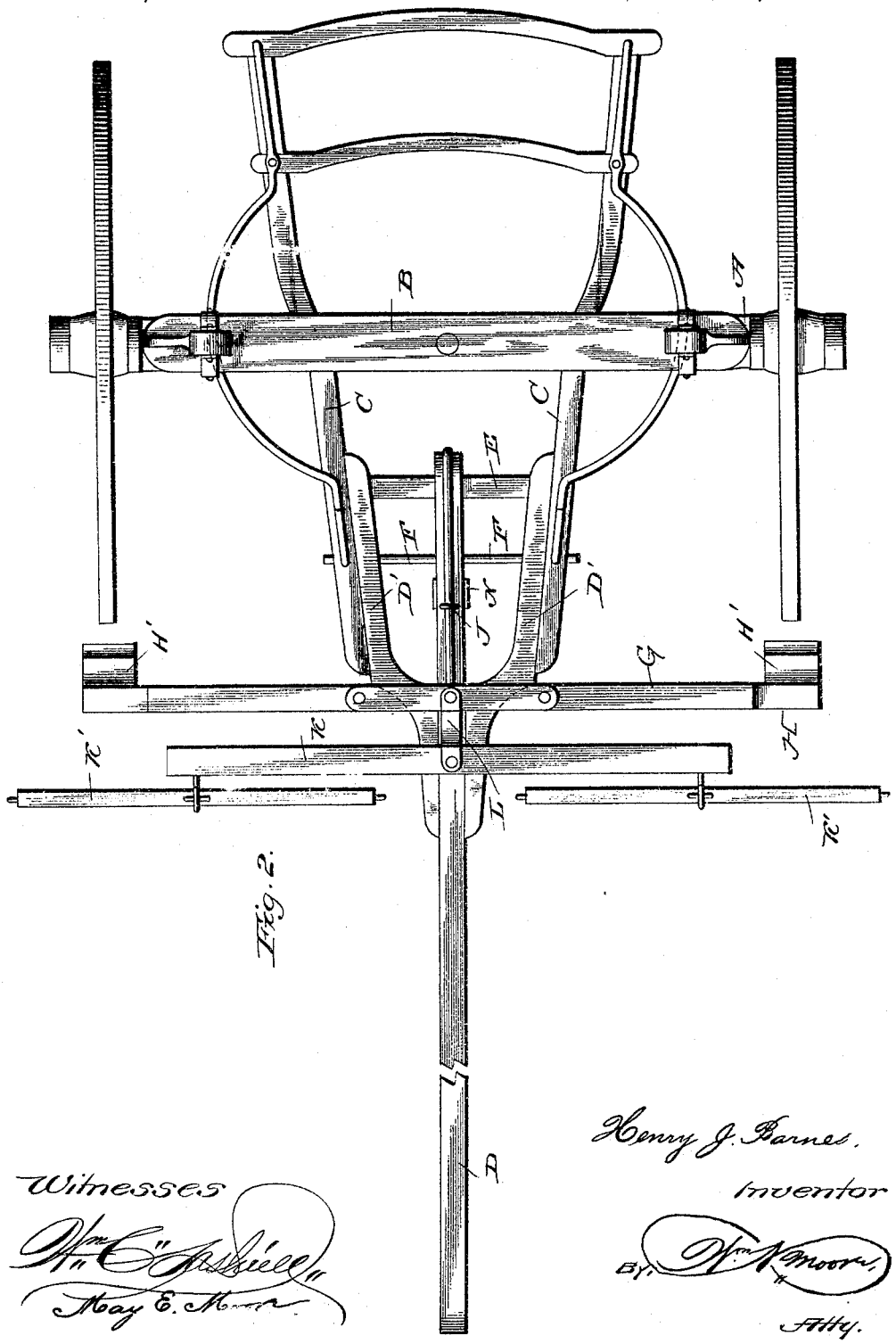

HENRY JEFFERSON BARNES, OF OXVILLE, ILLINOIS.

VEHICLE-BRAKE.

SPECIFICATION forming part of Letters Patent No. 489,189, dated January 3, 1893.

Application filed August 19, 1892. Serial No. 443,505. (No model.)

*To all whom it may concern:*

Be it known that I, HENRY JEFFERSON BARNES, a citizen of the United States, residing at Oxville, in the county of Scott and State of Illinois, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in vehicle brakes, and it has for its objects among others to provide a simple, cheap and efficient brake which is constructed and arranged to be actuated by the draft of the animal or animals attached to the vehicle.

Suitable means are provided for permitting of backing of the vehicle without applying the brake which, under normal conditions, is so arranged that when the animal backs or as in case of going down hill, the brake is automatically applied to the wheel or wheels. As soon as the animal starts the brake is removed from the wheels. The mechanism whereby the brake is caused to be thus actuated is simple, can be manufactured at a minimum cost and can be readily applied to any vehicle.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which Figure 1 is a side elevation showing sufficient of the running gear of a vehicle to enable one to understand my invention, with the improvement in position. Fig 2 is a top plan, and Fig. 3 is a detail view.

Like letters of reference indicate like parts in all of the views where they appear.

Referring now to the details of the drawings by letter, A designates the front axle carrying wheels of any known or approved form of construction.

B is the front bolster and C the hounds, these and other parts of the running gear being of any preferred construction.

D is the tongue which at the rear ends carries the tongue-hounds D' connected by the rear cross bar E and which is pivotally supported between the forward ends of the hounds C as upon a cross bar or rod F held in said hounds as shown and upon which the tongue is free to turn or move up and down. To the tongue at a point in front of the forward ends of the hounds there is fixedly secured a cross bar G to the under side of which is hung as upon the interlocking eye bolts G' the brake beam H to each end of which is affixed a brake shoe H' in any suitable manner and which are adapted to bear against the periphery of the wheels. It will thus be seen that while the cross bar G is rigid upon the tongue the brake beam and its shoes is hung to have pivotal movement to and from the wheels.

I is a rod arranged beneath the tongue, its forward end being held or guided in a suitable guide as $i$ near the front end of the tongue upon the under side thereof and the end of the rod is turned under and upon itself to form a loop or hook $i'$ adapted for attachment to the neck yoke, the rear end of this rod passing through a slot or opening I' upon the upper face of the cross bar G beneath the tongue as shown and its rear end is extended beyond the rear end of the tongue where it is bent upon itself and brought over the rear end of the tongue, being passed through a suitable guide J upon the upper face of the tongue and its forward end is connected with the double-tree K at each end of which is arranged a single-tree K'; a plate L is provided one end of which is attached to the rod I and the other end to the double-tree as shown to strengthen the connection at this point and forming a bearing for the upper end of the pivot of the double-tree.

The operation will be readily understood. When power is applied the brakes are withdrawn from the wheels. When the horses back the double-tree and single-trees are forced backward, and the brake beam being connected with the rod I by a pivoted link M, the brake beam is moved on its pivots to the rear and the brakes applied.

In order to permit of backing of the vehicle when desired without applying the brakes I have provided a gravity catch N which is pivoted on a pivot n on the under side of the rod I at a point in front of the pivot of the tongue and provided with a cord or chain O extending to within convenient reach of the driver so that when it is desired to back and not apply the brakes all that is necessary to do is to pull upon the cord and raise the catch the sides of which embrace the tongue and the square shoulder N' of which engages in front of the pivot of the tongue and prevents backward movement of the rod and the doubletree. When it is desired to go ahead as usual the catch is allowed to drop when the rod is free to be moved back and forth by the backward and forward movement of the horses.

Modifications in detail may be resorted to without departing from the spirit of the invention or sacrificing any of its advantages.

The brake may be applied to a one-horse vehicle if desired with slight changes which I consider unmistakably within the scope of my invention.

What I claim as new is:—

1. In a vehicle brake, the combination of the tongue, the cross bar rigidly secured thereto, the brake beam carrying the shoes and loosely connected with said cross-bar, the double tree the rod connected with the double tree at one end and at the other end supported in a guide on the tongue, the link connecting the rod and brake-beam, and the gravity catch, all arranged and adapted to operate as described.

2. In a vehicle brake, the combination with the double tree, the brake-beam and rod, connected therewith, of the catch pivoted at the underside of the rod and having the sides for embracing the tongue and the shoulder for engaging in front of the pivot of the tongue to prevent backward movement of the rod and double tree, for the purpose stated.

In testimony whereof I affix my signature in presence of two witnesses.

HENRY JEFFERSON BARNES.

Witnesses:
THOS. C. REED,
J. T. JOHNSON.